(12) United States Patent
Sakurai et al.

(10) Patent No.: US 7,619,663 B2
(45) Date of Patent: Nov. 17, 2009

(54) IMAGE PROCESSING APPARATUS FOR CORRECTING DISTORTION OF IMAGE AND IMAGE SHOOTING APPARATUS FOR CORRECTING DISTORTION OF SHOT IMAGE

(75) Inventors: Keiichi Sakurai, Akishima (JP); Tetsuji Makino, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 814 days.

(21) Appl. No.: 11/082,742

(22) Filed: Mar. 17, 2005

(65) Prior Publication Data

US 2005/0206753 A1 Sep. 22, 2005

(30) Foreign Application Priority Data

Mar. 19, 2004 (JP) ............................. 2004-081553

(51) Int. Cl.
  *H04N 5/217* (2006.01)
  *H04N 5/228* (2006.01)
  *G06K 9/36* (2006.01)
(52) U.S. Cl. ............... 348/241; 348/208.99; 348/222.1; 382/276; 382/289
(58) Field of Classification Search ............ 348/208.99, 348/169–172; 359/554–557; 382/276–308
See application file for complete search history.

(56) References Cited

U.S. PATENT DOCUMENTS

| | | | |
|---|---|---|---|
| 6,137,893 A * | 10/2000 | Michael et al. ............. 382/103 |
| 6,373,590 B1 | 4/2002 | Ancin et al. |
| 6,400,848 B1 * | 6/2002 | Gallagher .................. 382/254 |
| 6,687,421 B1 * | 2/2004 | Navon ........................ 382/289 |
| 6,816,187 B1 | 11/2004 | Iwai et al. |
| 6,901,167 B2 * | 5/2005 | Herley ........................ 382/199 |
| 7,001,024 B2 | 2/2006 | Kitaguchi et al. |
| 7,035,434 B2 * | 4/2006 | Estevez ....................... 382/107 |
| 7,110,568 B2 * | 9/2006 | Arcas-Luque et al. ....... 382/101 |
| 7,227,573 B2 * | 6/2007 | Stavely ..................... 348/240.2 |

(Continued)

FOREIGN PATENT DOCUMENTS

JP          05-101221 A          4/1993

(Continued)

OTHER PUBLICATIONS

Japanese Office Action (and English translation thereof) dated Jul. 29, 2008, issued in counterpart Japanese Patent Application No. JP 2003-354392.

(Continued)

*Primary Examiner*—Jason Chan
*Assistant Examiner*—Pritham Prabhakher
(74) *Attorney, Agent, or Firm*—Frishauf, Holtz, Goodman & Chick, P.C.

(57) ABSTRACT

A digital camera acquires the image of an original including an original from a shot image acquired by shooting. The digital camera reduces the image of the original and corrects distortion of the reduced image which is originated from the characteristic of a lens. As the digital camera performs distortion correction on the reduced image, the number of arithmetic operations in distortion correction is reduced, making distortion correction simpler. The digital camera acquires a rectangle defined by the contour of the original, extracts the image of the original to acquire an original image before reduction, and acquires an associated projection-transformed image by affine transformation. The digital camera acquires pixel positions of the original image using an affine parameter, and acquires pixel positions of the image before distortion correction using a relational expression of distortion correction performed on the reduced image.

15 Claims, 12 Drawing Sheets

U.S. PATENT DOCUMENTS

| | | |
|---|---|---|
| 7,269,298 B2 | 9/2007 | Tanaka |
| 7,301,564 B2 * | 11/2007 | Fan .......................... 348/222.1 |
| 7,418,126 B2 * | 8/2008 | Fujimoto et al. ............ 382/154 |
| 2002/0044681 A1 * | 4/2002 | Fujimoto et al. ............ 382/154 |
| 2002/0113946 A1 | 8/2002 | Kitaguchi et al. |
| 2004/0012679 A1 * | 1/2004 | Fan ........................ 348/207.99 |
| 2004/0101209 A1 | 5/2004 | Tanaka |
| 2004/0165786 A1 * | 8/2004 | Zhang et al. ................ 382/276 |

FOREIGN PATENT DOCUMENTS

| | | |
|---|---|---|
| JP | 05-266161 A | 10/1993 |
| JP | 06-274649 A | 9/1994 |
| JP | 2003-141520 A | 5/2000 |
| JP | 2000-228722 A | 8/2000 |
| JP | 2000-350239 A | 12/2000 |
| JP | 2001-223891 A | 8/2001 |
| JP | 2002-092606 A | 3/2002 |
| JP | 2003-078725 A | 3/2003 |
| JP | 2003-283916 A | 10/2003 |
| JP | 2003-288588 A | 10/2003 |

OTHER PUBLICATIONS

Japanese Office Action (and English translation thereof) dated Jul. 29, 2008, issued in counterpart Japanese Patent Application No. JP 2003-354429.

Japanese Office Action (and English translation thereof) dated Aug. 5, 2008, issued in a counterpart Japanese Application.

* cited by examiner (SHUTTER BUTTON 13)
IMAGE OF ORIGINAL

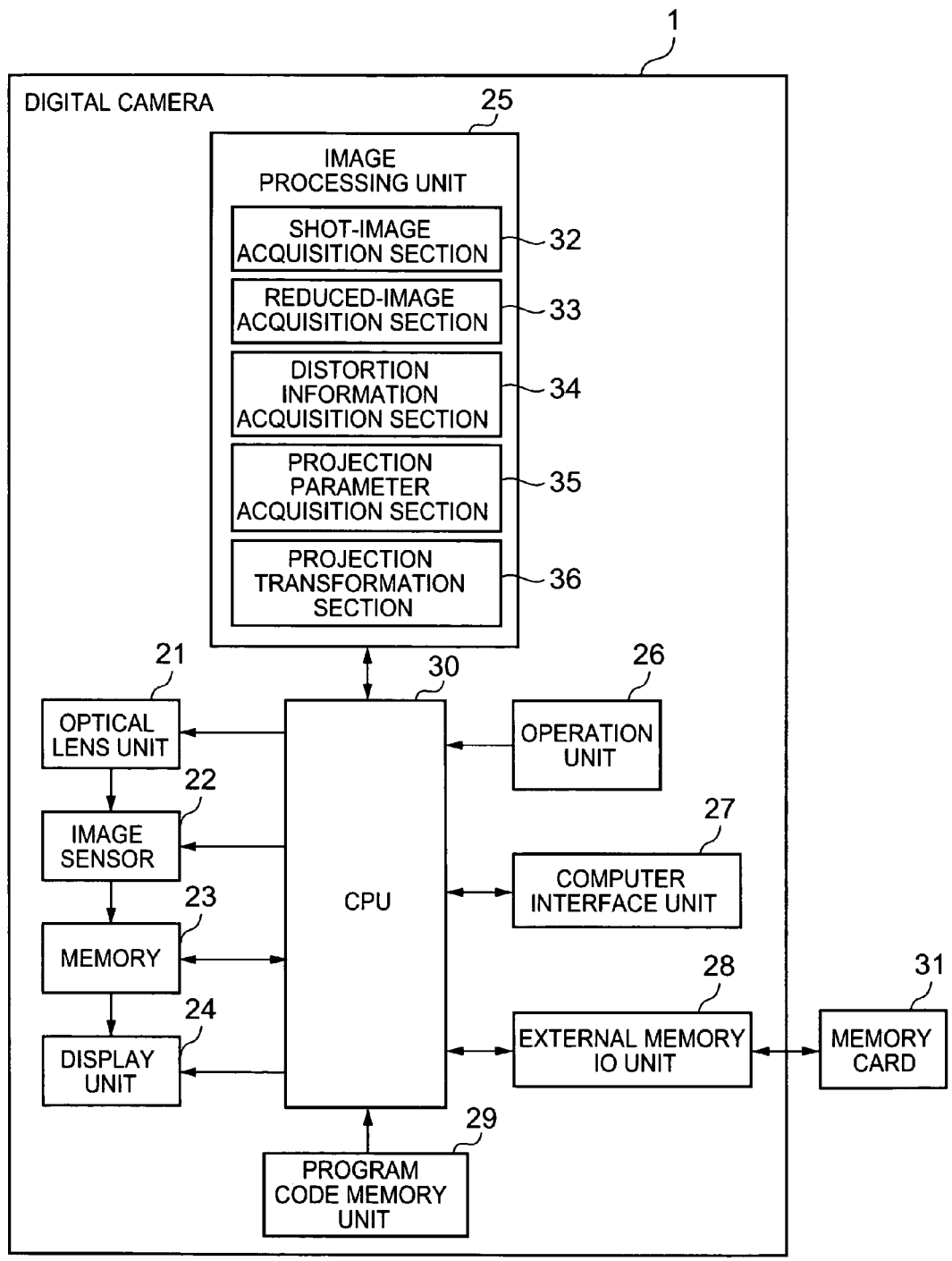

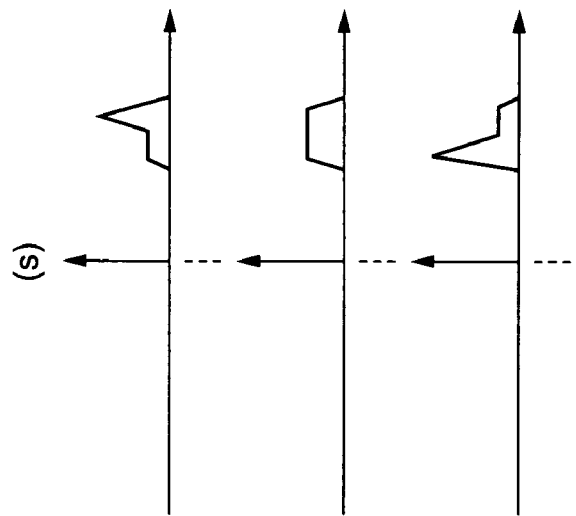
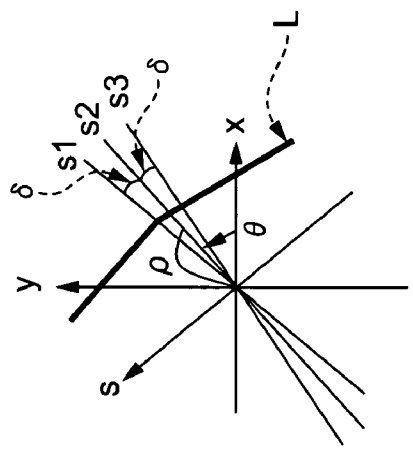
FIG. 7A
FIG. 7B  $\theta = \theta_1 + \delta$ (PROJECTION TO s1 AXIS)
FIG. 7C  $\theta = \theta_1$ (PROJECTION TO s2 AXIS)
FIG. 7D  $\theta = \theta_1 - \delta$ (PROJECTION TO s3 AXIS)

$45° \leqq \theta < 135°$ $-45° \leqq \theta < 45°$

IMAGE PROCESSING APPARATUS FOR CORRECTING DISTORTION OF IMAGE AND IMAGE SHOOTING APPARATUS FOR CORRECTING DISTORTION OF SHOT IMAGE

BACKGROUND OF THE INVENTION

1. Field of the Invention

The present invention relates to an image processing apparatus and an image shooting apparatus which easily correct distortion of an image, such as trapezoidal distortion.

2. Description of the Related Art

With advancement of digital cameras and cost reduction of storage type memories, studies have been made on applications in which digital cameras are not only used to shoot scenes and persons, but also shoot documents, such as papers and name cards, or what is written on a blackboard or so in a meeting, and digitally save those images in a personal computer or so for management.

In shooting a sheet using such a digital camera, the quadrangle of the sheet is deformed into a trapezoid. There is an image shooting system which corrects such trapezoidal distortion or keystone distortion. When a macrolens, a wide-angle lens or the like is used, the shape of a sheet is distorted into a barrel shape as shown in FIG. 13 due to the characteristics of those lenses. To acquire a high-quality image, such distortion should be corrected.

Various distortion correction methods are available to correct distortion originated from the lens characteristic. For example, because the distortion is generally distortion that is determined at the time of designing the lens, one possible method is to acquire points of an image having distortion which correspond to pixel coordinates of an ideal distortion-free image beforehand from the relationship between the pixel coordinates of the ideal distortion-free image and the pixel coordinates of the image having distortion, and acquire pixel data through interpolation or the like from the values of surrounding pixels.

This method however should perform pixel interpolation or so both in image extraction and projection correction and thus requires an interpolation operation twice. This increases degradation of an acquired image. When distortion is originated from the lens characteristic, correction should be carried out for each pixel, increasing the number of operations for correction, so that the overall processing takes time.

SUMMARY OF THE INVENTION

The present invention has been made to overcome the conventional problems, and aims at providing an image processing apparatus which corrects distortion of an image, and comprises a shot-image acquisition section which acquires a shot image of a subject to be shot, including a shooting target image which is an image portion corresponding to the subject to be shot; a reduced-image acquisition section which acquires a reduced image that is the shot image with a reduced resolution; a distortion information acquisition section which acquires distortion information indicative of distortion of the shooting target image based on the reduced image; a projection parameter acquisition section which acquires a projection parameter for converting the shooting target image to an ideal distortion-free image based on the distortion information; and a projection transformation section which produces a projection-transformed image by performing projection transformation on the shot image using the projection parameter.

The invention can easily correct distortion of an image, such as trapezoidal distortion. As an image shooting apparatus equipped with an image shooting capability can acquire a shooting target image free of distortion, such as linear distortion originated from a shooting angle or distortion originated from the lens characteristic, by performing the processing on a shot image acquired by shooting a subject to be shot.

BRIEF DESCRIPTION OF THE DRAWINGS

FIGS. 2A and 2B are diagrams for explaining the functions of the digital camera shown in FIG. 1, FIG. 2A showing a distorted shot image while FIG. 2B shows an ideal image after correction as if it were taken from the front;

FIG. 3 is a block diagram showing the structure of the digital camera shown in FIG. 1;

FIGS. 5A to 5C are explanatory diagrams of a contour acquisition process of acquiring the contour of a subject to be shot which is executed by an image processing apparatus shown in FIG. 2, FIG. 5A showing the image of an original deformed like a barrel by the distortion of an image-taking lens section, while FIG. 5B shows a reduced image undergone distortion correction and FIG. 5C shows an edge binary image;

FIGS. 7A to 7D are explanatory diagrams of Hough transformation for a deformed line, FIG. 7A showing Hough transformation for a distorted line while FIGS. 7B to 7D respectively show projection histograms to s1, s2 and s3 axes shown in FIG. 7A;

DETAILED DESCRIPTION OF THE PREFERRED EMBODIMENT

An image shooting apparatus according to one embodiment of the invention will be described below with reference to the accompanying drawings.

In the following description of the embodiment, an image shooting apparatus will be described as a digital camera.

Figure 1:
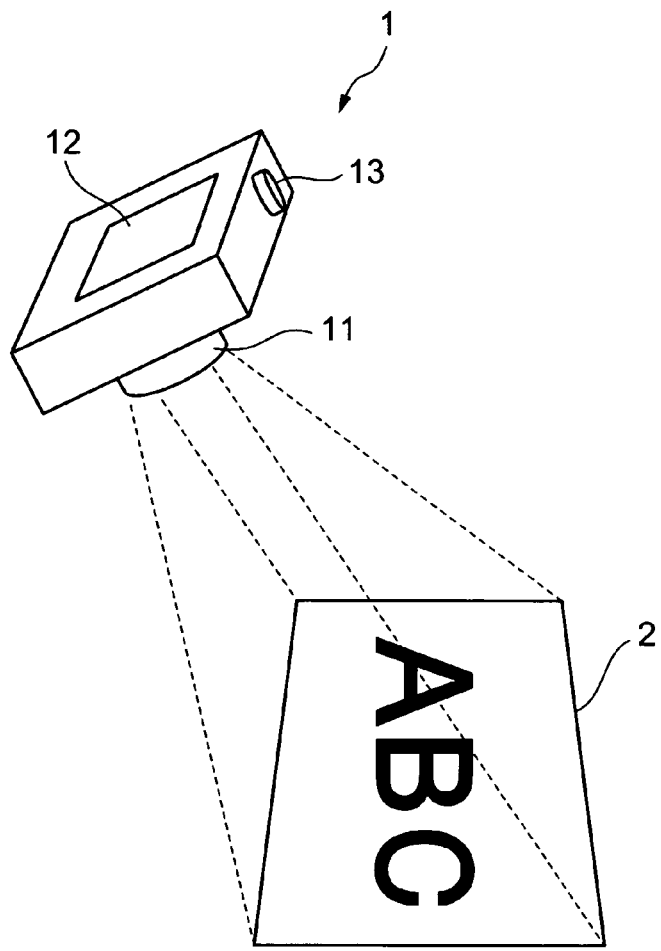
FIG. 1 is an explanatory diagram showing the structure of a digital camera according to one embodiment of the invention.

FIG. 1 shows the structure of a digital camera 1 according to the embodiment.

Figure 2A:
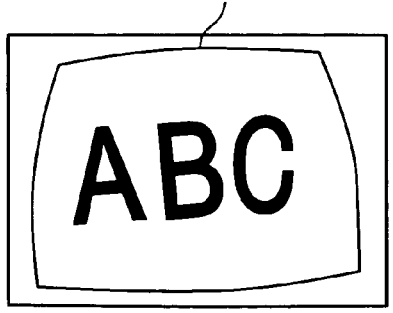
Figure 2B:
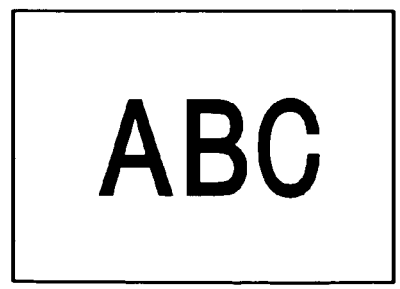

The digital camera 1 according to the embodiment shoots the contents described on the sheet of an original 2, corrects trapezoidal distortion or keystone distortion of the image of a subject to be shot (hereinafter referred to as "shooting target") or the image of the including the original 2, and generates an ideal image as shown in FIG. 2B, as if taken from the front, from a shot image as shown in FIG. 2A acquired by image shooting. The digital camera 1 has an image shooting lens section 11, a liquid crystal monitor 12 and a shutter button 13.

The image shooting lens section 11 has a lens or so for condensing light, and condenses light from the original 2 or so.

The liquid crystal monitor 12 displays an image taken inside via the image shooting lens section 11. The shutter button 13 is depressed when shooting the original 2. The digital camera 1 has a power switch, a mode switch an image adjustment key (not shown), and so forth in addition to the shutter button 13.

The power switch is used to power the digital camera 1 on or off. The mode switch is for setting an image shooting mode for shooting a subject, and a playback mode for reproducing shot images. The image adjusting key is operated when performing image processing.

As shown in FIG. 3, the digital camera 1 further includes an optical lens unit 21, an image sensor 22, a memory 23, a display unit 24, an image processing apparatus 25, an operation unit 26, a computer interface unit 27, an external memory IO unit 28, and a program code memory unit 29.

The optical lens unit 21 has the image shooting lens section 11 and a drive unit for the image shooting lens section 11, and forms an image by condensing light from the original 2 on the image sensor 22.

The image sensor 22 acquires the formed image as digital image data, and is comprised of a CCD or so. The image sensor 22 is controlled by a CPU 30. When the shutter button 13 is not depressed, the image sensor 22 generates digital image data with a low resolution for preview and sends the image data to the memory 23 regularly at intervals of 30 seconds or so. When the shutter button 13 is depressed, the image sensor 22 generates digital image data with a high resolution and sends the image data to the memory 23.

The memory 23 temporarily stores a low-resolution preview image, high-resolution image data or data of an original image to be undergone in the image processing apparatus 25 or image data after image processing. The memory 23 sends image data temporarily stored to the display unit 24 or the image processing apparatus 25.

The display unit 24 has the liquid crystal monitor 12 and displays an image on the liquid crystal monitor 12. The display unit 24 displays a low-resolution preview image or a high-resolution image, temporarily stored in the memory 23, on the liquid crystal monitor 12.

The image processing apparatus 25 performs image processing, such as compression of image data, correction of image distortion like keystone distortion, and image conversion, on image data temporarily stored in the memory 23.

The image processing apparatus 25 performs image processing on an image having keystone distortion as shown in FIG. 2A to generate an image which looks as if it were taken from the front as shown in FIG. 2B.

To correct keystone distortion of the image of the original, the image processing apparatus 25 extracts a quadrangle forming the contour of the image of the original from the distorted image of the original, and performs projection transformation of the image of the original. Performing such image processing, the image processing apparatus 25 acquires an assumed front image of the original 2.

More specifically, the image processing apparatus 25 mainly performs the following processes under the control of the CPU 30.

(1) Acquisition of the Contour From a Shot Image

This process is to acquire the [original] contour of the image of the original corresponding to the contour of the sheet of the original from a shot image acquired by shooting.

When the original is shot in a close range using a macrolens or a wide-angle lens in the optical lens unit 21, the image of the original is distorted like a barrel due to distortion of the image-taking lens section 11. The image processing apparatus 25 acquires the accurate contour of the image of the original by performing distortion correction even if the image has such distortion. The details of the process of acquiring the contour from a shot image will be discussed later.

(2) Image Conversion (Extraction, Projection Correction)

This image conversion process includes image extraction and projection correction. The image extraction extracts the contour (quadrangle) of the image of the original as a shooting target from a shot image.

The projection correction process performs projection transformation of the extracted image of the original using affine transformation to correct keystone distortion of the image of the original. The affine transformation is wide adapted in spatial conversion of an image. At the time of executing projection correction, the image processing apparatus 25 acquires corresponding points of the image of the original having distortion by correction corresponding to distortion correction.

(3) Image Clearing

The image clearing process acquires an image with an excellent visibility by increasing the luminance, color correction, etc. on an image undergone image conversion.

To perform the image clearing process, the image processing apparatus 25 extracts image effect correcting parameters from an image undergone image conversion. The image effect correcting parameters are variables necessary in an image effect process, such as the maximum value, the minimum value or the peak value of the luminance histogram, and the peak value or the average value of a chromatic histogram. The image processing apparatus 25 performs the image clearing correcting process by converting the extracted image effect correcting parameters to values which make the image clear.

(4) Image Compression

The image compression process compresses image data undergone the image clearing process.

The operation unit 26 acquires operation information of a user, such as the ON/OFF action of the power switch, and depression of the shutter button 13. The operation unit 26 sends the acquired operation information to the CPU 30.

The computer interface unit 27 operates as a USB storage class driver when the digital camera 1 is connected to a computer (not shown). Accordingly, when connected to the digital camera 1, the computer uses a memory card 31 as an external memory device for the computer.

The external memory IO unit 28 inputs and outputs image data or so to and from the memory card 31. The memory card 31 stores image data or so supplied from the external memory IO unit 28.

The program code memory unit 29 stores a program which is run by the CPU 30, and is comprised of a ROM or the like.

The CPU 30 controls the entire system according to the program stored in the program code memory unit 29. The memory 23 is also used as a work memory for the CPU 30.

When operation information is sent to the CPU 30 from the operation unit 26 as a result of depressing any of the switches and keys, the CPU 30 controls the image sensor 22, the memory 23, the display unit 24, the image processing apparatus 25 and so forth based on the operation information.

Specifically, when the mode switch is set to the shooting mode based on operation information from the operation unit 26 and the shutter button 13 is depressed halfway, the CPU 30 sets the individual sections of the image sensor 22, the memory 23, [the program code memory unit 29] the display unit 24, the image processing apparatus 25, etc. to the shooting mode. Under the state, the CPU 30 sets the image sensor 22 to a preview mode, and when the shutter button 13 is further depressed, the CPU 30 sets the image sensor 22 to a high-resolution mode to read the high-resolution image of the shooting target. When the mode is set to the playback mode by the mode switch, the CPU 30 sets the individual sections to the playback mode.

When operation information indicating depression of the image adjusting key is sent from the operation unit 26, the CPU 30 controls the image processing apparatus 25 and other necessary sections in such a way as to adjust an image.

The CPU 30 writes data of a preview image and a high-resolution image in the memory card 31 and reads written image data from the memory card 31 via the external memory IO unit 28. The CPU 30 writes image data compressed in, for example, the JPEG format in the memory card 31.

At the time of temporarily storing image data in the memory 23, the CPU 30 writes data of a preview image and a high-resolution image in different memory areas. The CPU 30 writes image data in associated image files in the memory card 31. When writing image data into the memory card 31, the CPU 30 writes header information about the image data in a header information memory area in the associated image file.

The operation of the digital camera 1 according to the embodiment will be described next.

When a user powers on the digital camera 1, the CPU 30 acquires data of the program stored in the program code memory unit 29. When the user sets the mode to the shooting mode using the mode switch and depresses the shutter button 13, the operation unit 26 sends its operation information to the CPU 30. The CPU 30 receives the operation information, and the CPU 30, the image processing apparatus 25, etc. execute the shooting process according to a flowchart illustrated in FIG. 4.

The CPU 30 sets the image sensor 22 to the preview mode (step S11).

Based on the operation information sent from the [image processing apparatus 25]the operation unit 26, the CPU 30 determines whether the shutter button 13 is depressed or not (step S12).

When it is determined that the shutter button 13 is depressed (YES at step S12), the CPU 30 changes the preview mode to the high-resolution mode and controls the image sensor 22 accordingly (step S13).

The CPU 30 writes data of the high-resolution image of a shooting target generated by the image sensor 22 in a memory area in the memory 23 different from a memory area where the preview image is written (step S14).

The CPU 30 determines whether reading of image data has been completed or not (step S15).

When it is determined that reading has not been completed (NO at step S15), the CPU 30 controls the image sensor 22 to continue reading image data.

When it is determined that every image data has been read and image transfer has been finished (YES at step S15), the CPU 30 generates a low-resolution preview image from the picked-up image (high-resolution image) and writes data of the preview image in the preview-image memory area in the memory 23 (step S16).

The CPU 30 controls the image processing apparatus 25 to generate compressed data of the shot image. (step S17).

The CPU 30 saves the compressed data in the memory card 31 via the external memory IO unit 28 (step S18).

Next, under the control of the CPU 30, the operation unit 26 acquires the contour of the image of the original which is the shooting target from the shot image according to a flowchart illustrated in FIG. 4 to be discussed later (step S19).

The CPU 30 determines whether the image processing apparatus 25 could acquire the contour of the shooting target or not (step S20).

When the CPU 30 has decided that acquisition has been done (YES at step S20), the image processing apparatus 25 creates a projection transformation image based on the acquired projection parameters (step S21).

When the image adjusting key of the operation unit 26 is depressed, the operation unit 26 sends their operation information to the CPU 30. The CPU 30 sends the operation information from the operation unit 26 to the image processing apparatus 25, which in turn performs adjustment of image transformation according to the sent operation information (step S22).

The image processing apparatus 25 extracts image effect correction parameters for the image clearing process (step S23), and executes the image clearing process (step S24).

The image processing apparatus 25 performs compression on image data which has undergone the image clearing process, thereby generating compressed data of the converted image (step S25).

The image processing apparatus 25 writes the generated compressed data of the converted image in the memory card 31 (step S26).

When it is determined that extraction of the contour of the shooting target has not been done (NO at step S20), on the other hand, the CPU 30 performs a warning process (step S27).

The CPU 30, etc. terminate the shooting process in the above manner. The CPU 30, etc. repetitively execute the shooting process unless the user operates some key to terminate the shooting process.

Next, the shooting process which is executed by the image processing apparatus 25 will be described.

Figure 4:
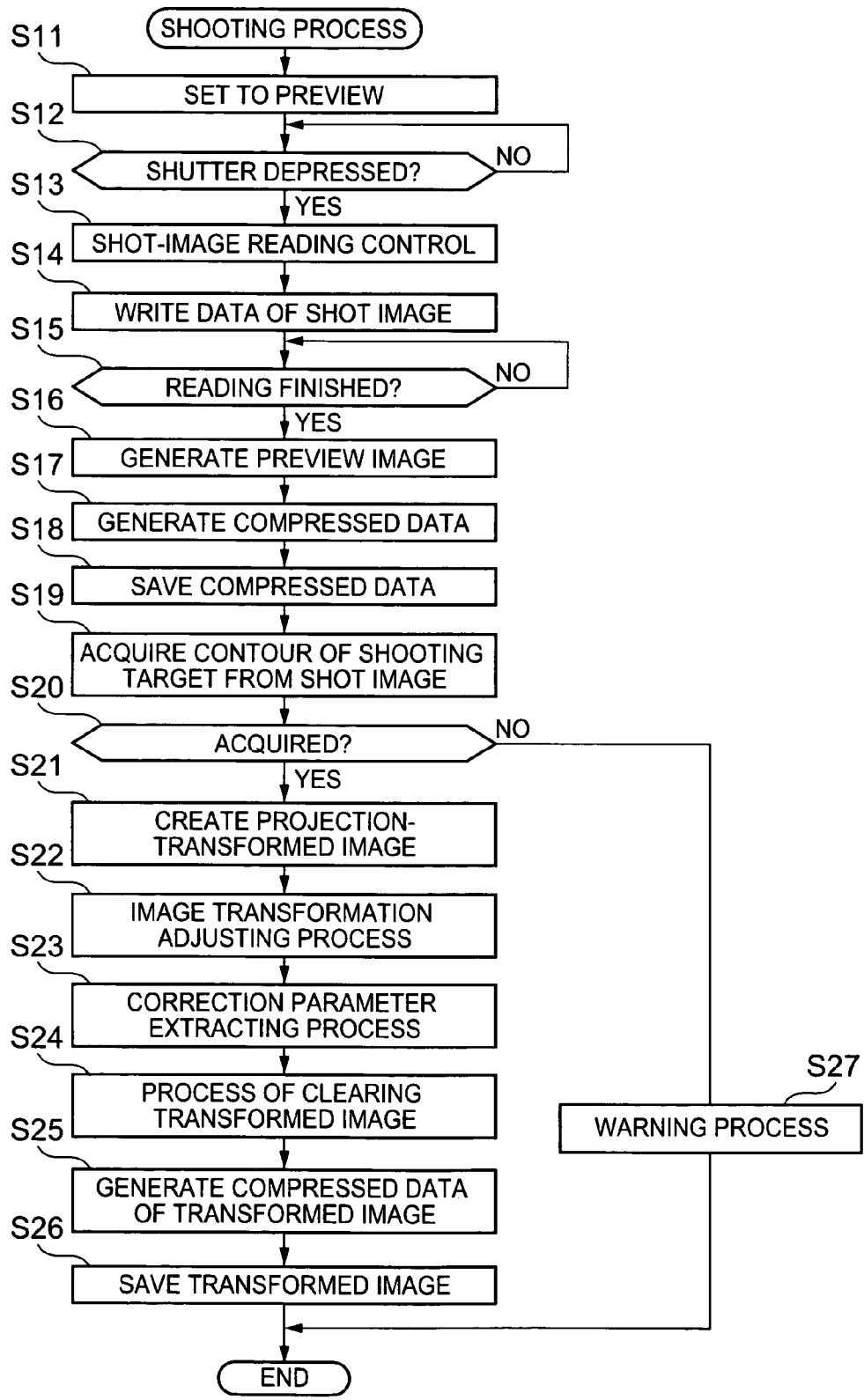
FIG. 4 is a flowchart illustrating a shooting process which is executed by the digital camera shown in FIG. 1.

(1) Acquisition of the Contour From a Shot Image (Process at Step S19 in FIG. 4)

To acquire the contour of a shooting target from a shot image, the image processing apparatus 25 first generates a reduced image from the shot image acquired by shooting the shooting target, and acquires an edge binary image from the generated reduced image. The reason why the contour of the shooting target is acquired using a reduced image of the image of the shooting target, not the image of the shooting target itself, is because the precision of acquiring the contour need not be so high, so that the burden on the process can be made lighter by using a reduced image.

Figure 5A:
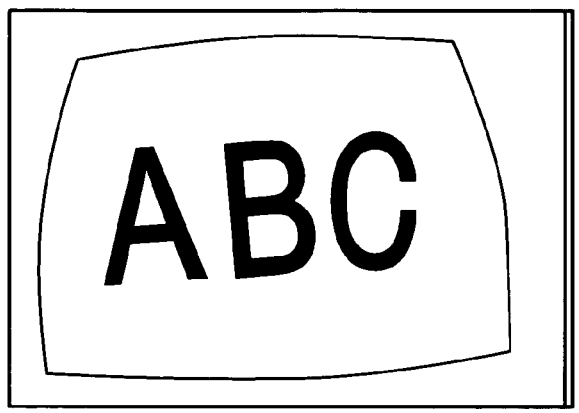

As shown in FIG. 5A, a shot image generally becomes an image distorted according to the lens characteristic of the image-taking lens section 11. To improve the precision of detecting extraction of the contour, the image processing apparatus 25 reduces a shot image while correcting distortion of an input image a distorted shot image as shown in FIG. 5A, thereby acquiring a distortion-corrected reduced image as shown in FIG. 5B.

Figure 5B:
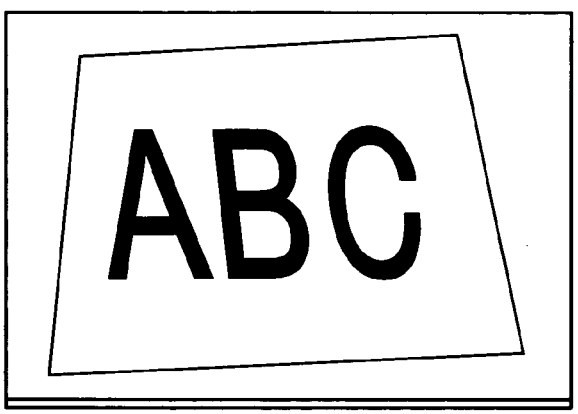
Figure 5C:
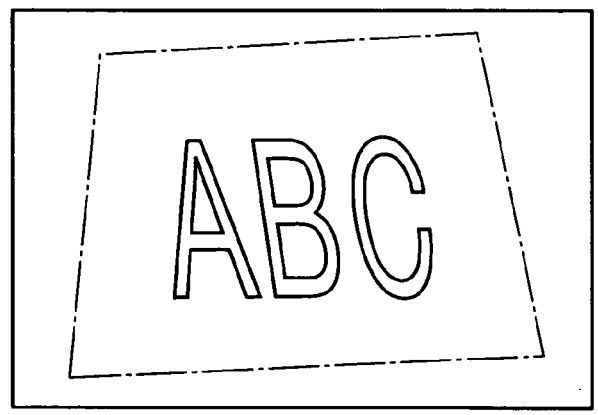

Then, the image processing apparatus 25 acquires an edge binary image indicating the contour of the shot image as shown in FIG. 5C from the reduced image as shown in FIG. 5B. At the time of acquiring a reduced image, the image processing apparatus 25 also performs distortion correction of the input image this way. The following will describe the idea of acquiring a reduced image while performing distortion correction.

Let P(x, y) be an input image input to the image sensor 22 via the image-taking lens section 11 and xmax and ymax be its x-directional and y-direction image sizes, and suppose that a reduced image Q(m, n) which is 1/K of the input image is produced.

With (x', y') being a coordinate system free of distortion corresponding to the input image P(x, y), the relationship between the coordinate system (x', y') and the reduced image Q(m, n) is given by the following equation 1.

$$x' = m \times K$$
$$y' = n \times K \quad (1)$$

where
- x': the x coordinate of the coordinate system free of distortion corresponding to the coordinates Q(x, y) of the reduced image, and
- y': the y coordinate of the coordinate system free of distortion corresponding to the coordinates Q(x, y) of the reduced image.

It is assumed that in the embodiment the input image P(x, y) and the coordinate system (x', y') are given by the following equation 2.

$$(x, y) = \frac{1 - k(r/R)}{1 - k}(x', y') \quad (2)$$
$$R = x_c^2 + y_c^2$$
$$r = (x' - x_c)^2 + (y' - y_c)^2$$

where
- $x_c$: x coordinate of the center of the image,
- $y_c$: y coordinate of the center of the image, and
- k: distortion coefficient which is determined by the lens.

Substituting m=0 to xmax/K and n=0 to ymax/K into the equations 1 and 2 in order, a reduced image q is acquired. The number of operations for the reduced image becomes $1/(K^2)$ with respect to the original image.

To acquire an edge binary image as shown in FIG. 5C, a filter for edge detection called a Roberts filter, for example, should be used on the distortion-corrected reduced image as shown in FIG. 5B. The Roberts filter acquires two filters Δ1 and Δ2 by weighing two 4-neighbor pixels and averaging them to thereby detect the edge of an image. The conversion using the Roberts filter is expressed by the following equation 3.

$$Pe(x, y) = \sqrt{(\Delta 1)^2 + (\Delta 2)^2} \quad (3)$$
$$\Delta 1 = 1 \cdot f(x, y) + 0 \cdot f(x+1, y) +$$
$$\quad 0 \cdot f(x, y-1) + 1 \cdot f(x+1, y-1)$$
$$\quad = f(x, y) - f(x+1, y-1)$$
$$\Delta 2 = 0 \cdot f(x, y) + 1 \cdot f(x+1, y) -$$
$$\quad 1 \cdot f(x, y-1) + 0 \cdot f(x+1, y-1)$$
$$\quad = f(x+1, y) - f(x, y-1)$$

where
- Pe(x, y): pixel value of coordinates (x, y) (after conversion)
- f(x, y): pixel value of coordinates (x, y) (before conversion)

The image converted by the equation 3 is digitized according to the following equation 4.

$$BW(x, y) = 1 (Pe(x, y) \geq V\_thresh)$$
$$BW(x, y) = 0 (Pe(x, y) < V\_thresh) \quad (4)$$

where
- BW(x, y): edge binary image
- V_thresh: preset threshold

The threshold V_thresh is a preset value which is memorized by the image processing apparatus 25.

To acquire the contour of the shooting target from a shot image, lines which form the contour of the shot image are acquired from the acquired edge binary image. The image processing apparatus 25 acquires the lines using Hough transformation.

Figure 6A:
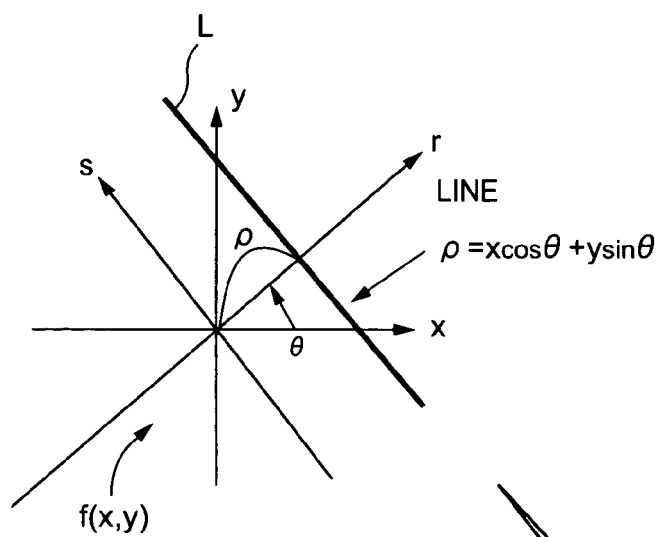
FIGS. 6A and 6B are explanatory diagrams of Hough transformation.
Figure 6B:
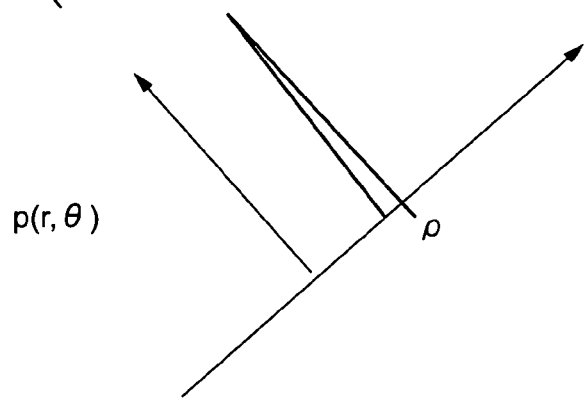

The Hough transformation is a scheme of projecting image data of (X, Y) coordinates indicating a line L as shown in FIG. 6A onto a projection plane passing the center of the image and having an inclination θ to generate a projection histogram on the ρ axis of the projection plane. In other words, the Hough transformation projects points constituting a line on the X-Y plane as shown in FIG. 6A onto the ρ-θ plane as shown in FIG. 6B expressed by the following equation 5 to convert the points to the number of votes on the ρ-θ coordinate system.

$$\rho = x \cos\theta + y \sin\theta \quad (5)$$

When the line L is deformed as shown in FIG. 7A, with votes given on the s1 axis, the s2 axis and the s3 axis, the projection histogram shows a distribution as shown in FIGS. 7B to 7D. Note that the s1 axis and the s3 axis are axes which are inclined respectively by angles +δ and −δ about the origin of the (X, Y) coordinate system with an angle θ1 of the s2 axis taken as a reference.

As shown in FIGS. 7B to 7D, while the number of votes on the s2 axis should have a peak by the original line L, the peak value on the s2 axis becomes lower than the peak values on the s1 axis and the s3 axis. The image processing apparatus 25 may detect a peak θ+δ or θ−δ and select a quadrangle candidate showing the wrong contour of the image of the original. According to the embodiment, distortion correction is executed at the time of generating a reduced image as mentioned above, distortion as shown in FIG. 7A does not occur and such a wrong contour of the original will not be extracted.

The contents of the quadrangle candidate selecting process for the image of an original will be discussed below.

To select a quadrangle candidate for the image of an original, lines are acquired based on the peak values detected through the Hough transformation and are then combined to produce a quadrangle candidate.

When the angle θ at the coordinates (x, y) of each point is changed from 0 to 360 degrees through the Hough transformation, the same line is expressed by one point on the ρ-θ plane. It is therefore possible to determine that the ρ-θ coordinates which have a large number of votes can be considered as a line. At this time, the number of votes becomes the number of pixels on the line and can thus be considered as the length of the line and can be eliminated from candidates for the line.

At the time of performing Hough transformation, the processing speed can be improved by reducing the number of points of an inspection target and the number of angles θ. According to the scheme using Hough transformation, the greater the number of points of an inspection target and the number of angles θ become, the slower the processing speed becomes. To avoid the drop of the processing speed, an edge image is reduced at the time of edge detection by thinning data on the coordinates of the points of the inspection target in both the X- and Y-axial directions at given intervals. This can reduce the number of points of the inspection target.

The number of inspection angles can be reduced further by the following method.

Let us consider the coordinate system where the center of an edge image which is an inspection target is the origin. As ρ takes a negative value, if the angle θ is measured within the range of $0° \leq \theta < 180°$, ρ becomes negative within the remaining range of $180° \leq \theta < 0°$.

Figure 8A:
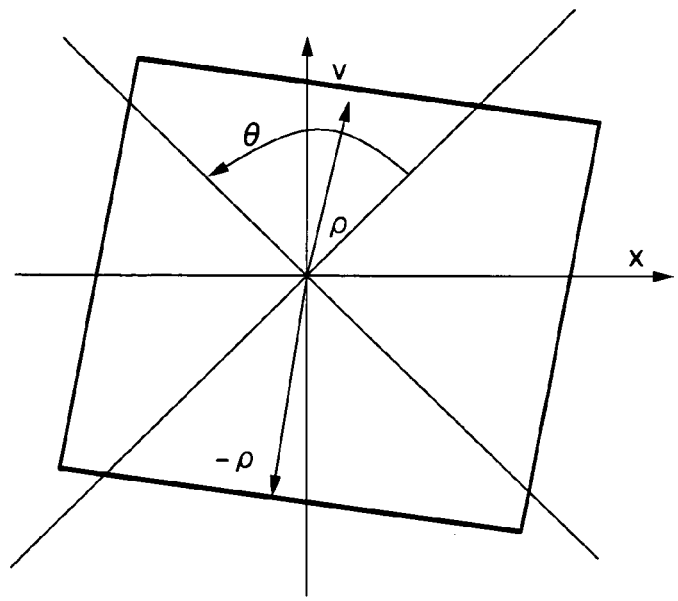
FIGS. 8A and 8B are explanatory diagrams of a scheme of reducing an inspection angle in Hough transformation.
Figure 8B:
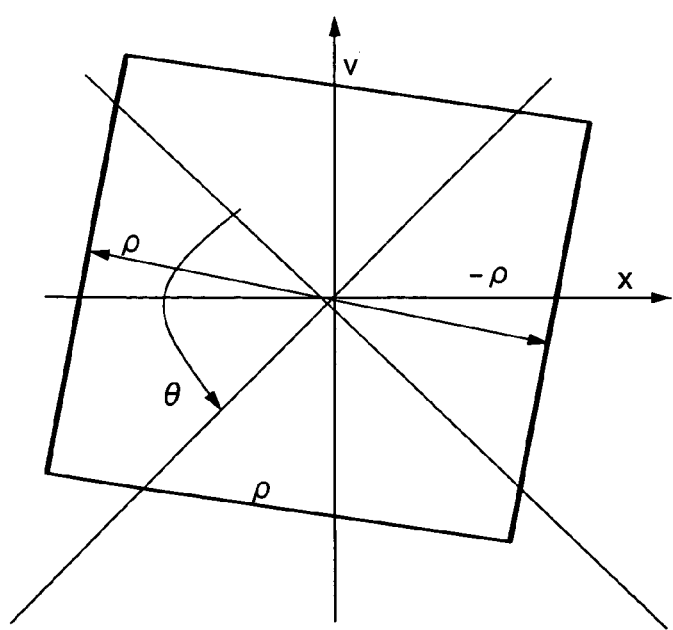

When the center of the shooting target is positioned near the center of the image, however, the individual sides of the shooting target (quadrangle) to be actually shot are present on up and down and right and left. In this case, it is more efficient to measure the number of votes on the ρ-θ plane within the range given by the following equation as shown in FIGS. 8A and 8B than to inspect them within the range of $0° \leq \theta < 180°$.

Upper and Lower Sides
$45° \leq \theta < 135°$ (or $225° \leq \theta < 315°$)
at this time, sin θ: 0.707→1→0.707,
cos θ: 0.707→0→0.707

Right and Left Sides
$135° \leq \theta < 225°$ (or $315° \leq \theta < 45°$)
at this time, sin θ: 0.707→1→0.707,
cos θ: −0.707→−1→−0.707

The upper and lower sides or the right and left sides can be specified depending on whether the value of ρ is positive or negative. When the center of the shooting target is positioned near the center of the image, as apparent from the above, the sides constituting the contour can be selected more efficiently.

Lines which form the quadrangle of the contour of the image of the shooting target are specified from those lines which are detected through Hough transformation.

In general, the outermost quadrangle in the shooting target may be specified as the contour of the shooting target. The aforementioned maximum area can be specified by specifying the upper and lower sides and right and left sides to those with the maximum absolute values |ρ| of ρ. Sorting the absolute values |ρ| in size order, the order is determined as the priority order of line candidates.

When four lines of the quadrangle are selected, their points of intersection are then acquired. The xy coordinates at which the four lines of the quadrangle intersect one another are computed by converting lines expressed by the ρ-θ system to lines of the (x, y) coordinate system.

As the acquired coordinates are the coordinates (m, n) of a reduced image, the coordinate values, if multiplied by K, correspond to the coordinates (x, y) of the original image. Let the coordinates of the four vertices of the quadrangle acquired in that manner be (x0, y0), (x1, y1), (x2, y2) and (x3, y3).

Figure 9:
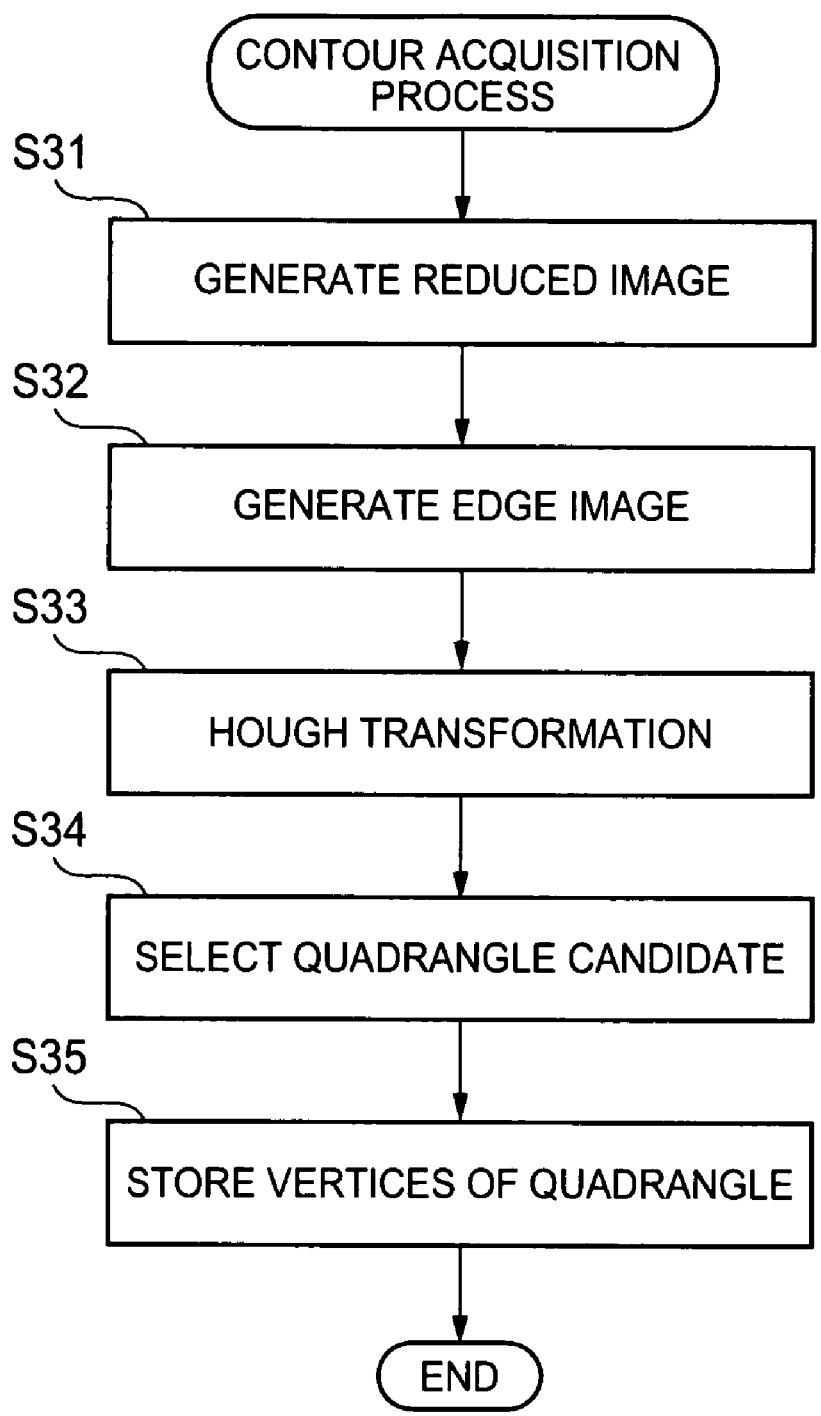
FIG. 9 is a flowchart illustrating the contents of a process of acquiring the contour of a subject to be shot which is executed by the image processing apparatus shown in FIG. 3.

Based on the concept, the image processing apparatus 25 executes the process of acquiring the contour of the shooting target according to the flowchart illustrated in FIG. 9.

The image processing apparatus 25 acquires a reduced image Q from the shot image by sequentially substituting m=0 to xmax/K and n=0 to ymax/K in the equations 1 and 2 (step S31).

The image processing apparatus 25 performs an arithmetic operation using the Roberts filter expressed by the equation 3, and acquires an edge binary image by digitizing the reduced image according to the equation 4 (step S32).

The image processing apparatus 25 performs Hough transformation on the acquired edge binary image according to the equation 5 to detect lines forming the edge binary image (step S33).

Figure 10:
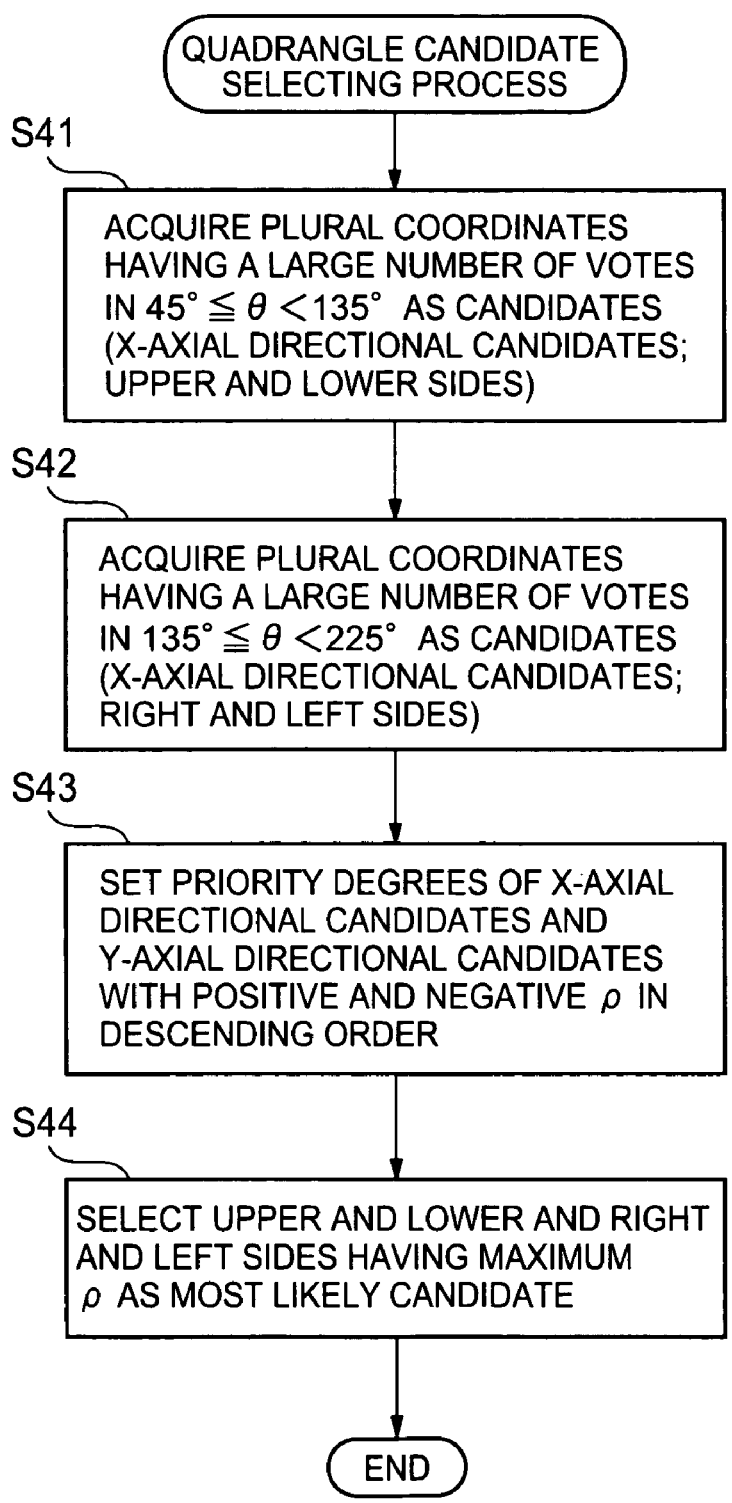
FIG. 10 is a flowchart illustrating the contents of a quadrangle candidate selecting process which is executed by the image processing apparatus shown in FIG. 3.

The image processing apparatus 25 selects quadrangle candidates by combining the detected lines (step S34). The image processing apparatus 25 executes the process of selecting the quadrangle candidates according to the flowchart illustrated in FIG. 10.

That is, the image processing apparatus acquires a plurality of coordinates which have a large number of votes in the range of $45° \leq \theta < 135°$ as candidates for lines forming the upper and lower sides (step S41).

Likewise, the image processing apparatus acquires a plurality of coordinates which have a large number of votes in the range of $135° \leq \theta < 225°$ as candidates for lines forming the right and left sides (step S42).

The image processing apparatus 25 sets the degrees of priority of those candidates in the X-axial direction and the candidates in the Y-axial direction the signs of whose ρ values differ in order from a descending order (step S43).

The image processing apparatus 25 selects the upper and lower and right and left sides which have the maximum values of ρ as the most likely candidates (step S44).

The image processing apparatus 25 writes the vertex coordinates of the selected quadrangle candidate (step S35 in FIG. 9). The quadrangle candidate is selected this way.

(2) Image Conversion (Process at Step S21 in FIG. 4)

To begin with, projection transformation will be described.

Figure 11:
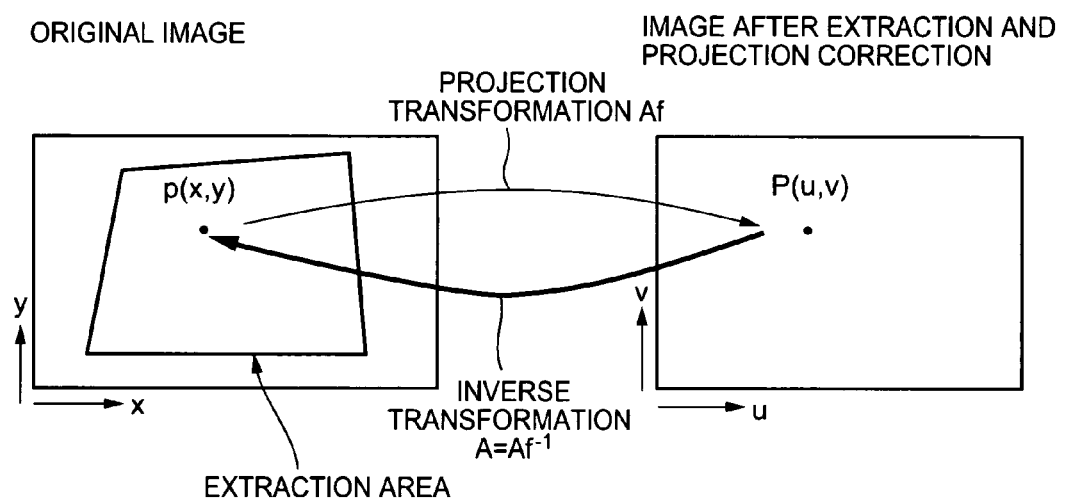
FIG. 11 is an explanatory diagram of affine transformation.

As shown in FIG. 11, let p(x, y) and P(u, v) be the original image to be subjected to extraction and projection correction and before projection transformation and a projection-transformed image after projection transformation, respectively, the original image p(x, y) and the projection-transformed image P(u, v) are associated with each other by the affine transformation equation. In FIG. 11, (x, y) indicates the pixel position of the original image p(x, y), and (u, v) indicates the pixel position of the projection-transformed image P(u, v).

The image processing apparatus 25 acquires affine parameters by associating the vertex coordinates (x0, y0), (x1, y1), (x2, y2) and (x3, y3) of the quadrangle candidate for the image of the original acquired by the process of selecting the quadrangle candidate for the image of the original with elements of the matrix of the general equation of the affine transformation.

Affine transformation from the projection-transformed image P(u, v) to be acquired to the original image p(x, y) is given by the following equation 7.

$$x = \frac{x'}{z'} = \frac{a_{11}u + a_{21}v + a_{31}}{a_{13}u + a_{23}v + a_{33}} \qquad (7)$$

$$y = \frac{y'}{z'} = \frac{a_{12}u + a_{22}v + a_{32}}{a_{13}u + a_{23}v + a_{33}}$$

In the equation 7, the affine parameters are given by the following equation 8.

$$a11 = x1 - x0 + \alpha \cdot x1 \quad a21 = x3 - x0 + \beta \cdot x3 \quad a31 = x0 \qquad (8)$$
$$a12 = y1 - y0 + \alpha \cdot y1 \quad a22 = y3 - y0 + \beta \cdot y3 \quad a32 = y0$$
$$a13 = \alpha \qquad\qquad\qquad a23 = \beta$$

where α and β are given by the following equation 9.

$$\alpha = \frac{(x0-x1+x2-x3)\cdot(y3-y2)-(x3-x2)\cdot(y0-y1+y2-y3)}{(x1-x2)\cdot(y3-y2)-(x3-x2)(y1-y2)} \quad (9)$$

$$\beta = \frac{(x1-x2)\cdot(y0-y1+y2-y3)-(x0-x1+x2-x3)\cdot(y1-y2)}{(x1-x2)\cdot(y3-y2)-(x3-x2)(y1-y2)}$$

The projection-transformed image P(u, v) can be acquired from the original image p(x, y) based on the equations 7 to 9. Further, the image processing apparatus 25 performs distortion correction in addition to extraction and projection transformation.

To execute distortion correction, first, the pixel positions of the original image p(x, y) corresponding to the pixel positions of the projection-transformed image P(u, v) are acquired. In acquiring the projection-transformed image P(u, v), it is convenient to acquire the pixel positions (x, y) of the original image p(x, y) corresponding to the pixel positions (u, v) of the projection-transformed image P(u, v) by using inverse transformation A of the affine transformation Af, rather than acquiring the pixel positions (u, v) of the projection-transformed image P(u, v) corresponding to the pixel positions (x, y) of the original image p(x, y) using the affine transformation Af, as shown in FIG. 11.

To acquire the pixel positions of the original image p(x, y) corresponding to the pixel positions (u, v) of the projection-transformed image P(u, v), affine parameters given by the equation 8 are used. It is to be noted however that the pixel positions (x, y) are the pixel positions of a distortion-free image or an image undergone distortion correction, so that the original image p(x, y) are replaced with an image p1(x', y') to set an image before distortion correction to p(x, y). With the replacement done, the equation 7 is rewritten to be the following equation 10.

$$x' = \frac{x''}{z''} = \frac{a_{11}u + a_{21}v + a_{31}}{a_{13}u + a_{23}v + a_{33}} \quad (10)$$

$$y' = \frac{y''}{z''} = \frac{a_{12}u + a_{22}v + a_{32}}{a_{13}u + a_{23}v + a_{33}}$$

where
(x", y", z"): coordinates of the image P without distortion
(x', y'): coordinates of the image p without distortion.

The image p1(x', y') is associated with the image p(x, y) before distortion correction by the relational equation 2. Using the equation 2, therefore, individual coordinates (x, y) of the corresponding image p(x, y) before distortion correction can be acquired from the coordinate positions (x', y') of the image p1(x', y') while performing correction corresponding to distortion correction which has been executed when having generated the reduced image.

The pixel values x, y of the points p(x, y) of the original image corresponding to the individual pixels of the projection-transformed image P(u, v) acquired this way should not necessarily be an integer. In this respect, a bilinear scheme should be used as the interpolation method.

The bilinear-based interpolation is to acquire the pixel values of the coordinates (x, y) of one image or the original image (projection-transformed image p) corresponding to the pixel values of the coordinates (u, v) of the other image (image P) from the pixel values of the surrounding four points p(X, Y), p(X+1,Y), p(X, Y+1) and p(X+1, Y+1) as the pixel values of the coordinates (u, v) of the other image, as given by the following equation 11.

$$P(u, v) = (1-kx)*(1-ky)*p(X, Y) + kx*(1-ky)*p(X+1, Y) + (1-kx)*ky*p(X, Y+1) + kx*ky*p(X+1, Y+1) \quad (11)$$

where with p(x, y) being the coordinates of the point p of one image,
kx: the value equal to or smaller than a decimal point of x
ky: the value equal to or smaller than a decimal point of y
X: integer portion (x)
Y: integer portion (y).

Figure 12:
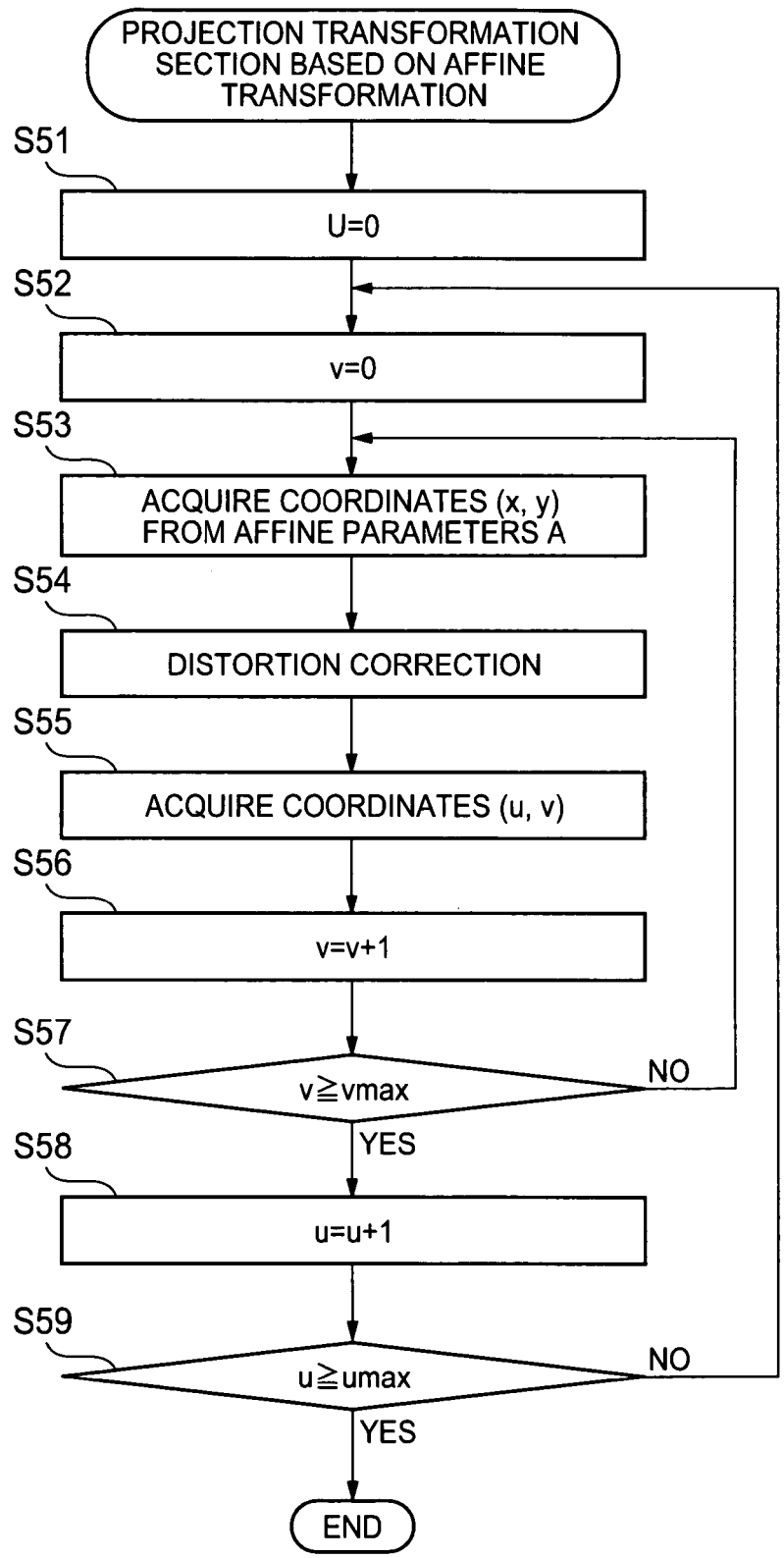
FIG. 12 is a flowchart illustrating the contents of a projection transformation process based on affine transformation, which is executed by the image processing apparatus shown in FIG. 3.
Figure 13:
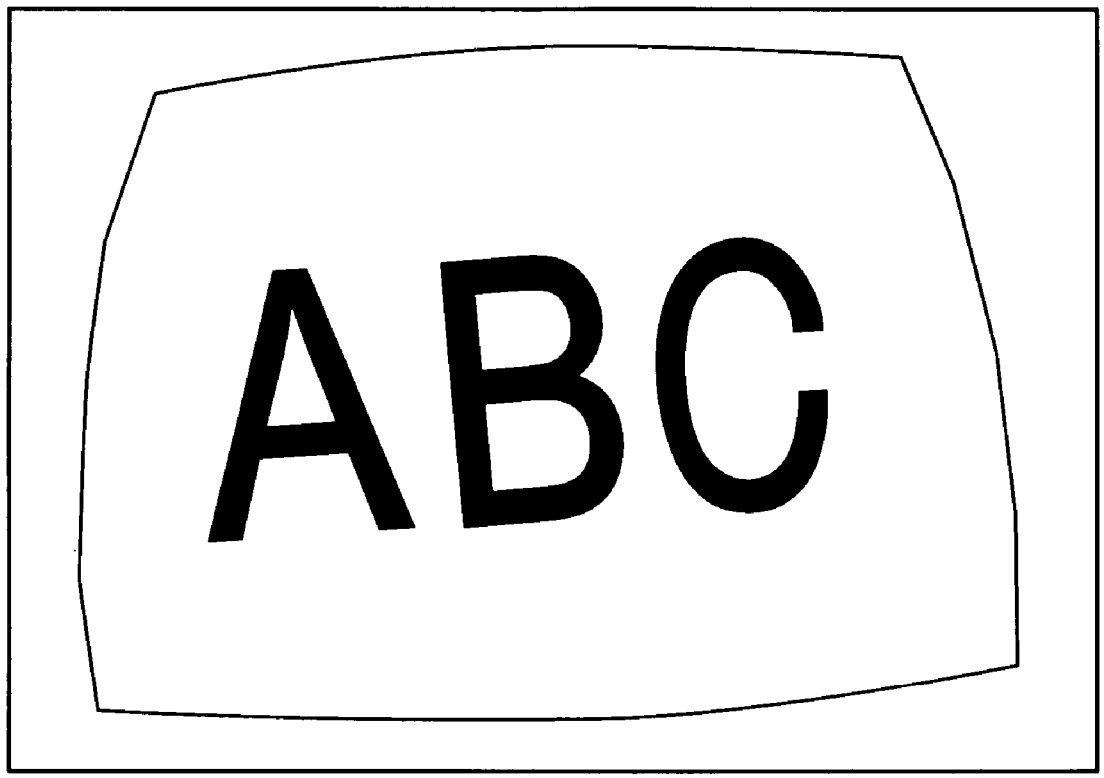
FIG. 13 is an explanatory diagram showing a distorted image.

Based on the concept, the image processing apparatus 25 executes the projection transformation process based on affine transformation according to the flowchart illustrated in FIG. 12. Let the coordinates u, v indicating the pixel positions (u, v) of the projection-transformed image P(u, v) be 0≦u≦umax and 0≦v≦vmax, respectively.

The image processing apparatus 25 initializes the coordinate u of the projection-transformed image P(u, v) to 0 (step S51).

The image processing apparatus 25 initializes the coordinate v of the projection-transformed image P(u, v) to 0 (step S52).

The image processing apparatus 25 acquires the pixel positions (x', y') of the image p1(x', y') by substituting the pixel positions (u, v) of the projection-transformed image P(u, v) in the equation 10 (step S53).

The image processing apparatus 25 performs correction on the acquired pixel positions (x', y') of the image p1(x', y') according to the equation 2 to acquire the pixel positions (x, y) of the image p(x, y) (step S54).

The image processing apparatus 25 performs bilinear-based interpolation according to the equation 11 using the projection-transformed image P(u, v) and the image p(x, y) to acquire the pixel values of the projection-transformed image P(u, v) (step S55).

The image processing apparatus 25 increments the coordinate v of the projection-transformed image P(u, v) by 1 (step S56).

The image processing apparatus 25 compares the coordinate v of the projection-transformed image P(u, v) with the maximum value vmax, and determines whether the coordinate v of the projection-transformed image P(u, v) becomes equal to or greater than the maximum value vmax (step S57).

When it is determined that the coordinate v is less than the maximum value vmax (NO at step S57), the image processing apparatus 25 executes steps S53 to S56 again.

When it is determined that the coordinate v has reached the maximum value vmax (YES at step S57) through the repetitive execution of steps S53 to S56, the image processing apparatus 25 increments the coordinate u of the projection-transformed image P(u, v) by 1 (step S58).

The image processing apparatus 25 compares the coordinate u with the maximum value umax, and determines whether the coordinate u becomes equal to or greater than the maximum value umax (step S59).

When it is determined that the coordinate u is less than the maximum value umax (NO at step S59), the image processing apparatus 25 executes steps S52 to S58 again.

When it is determined that the coordinate u has reached the maximum value umax (YES at step S59) through the repetitive execution of steps S52 to S58, the image processing apparatus 25 terminates the image converting process.

If the pixel values of the projection-transformed image P(u, v) can be acquired this way, the projection-transformed image P(u, v) can be acquired from the image p(x, y) before distortion correction.

According to the embodiment, as described above, distortion correction is not executed over the entire original image, but distortion correction is executed at the time of generating a reduced image to acquire the contour of the image of an original. Therefore, the amount of computation for distortion correction becomes smaller, making it possible to shorten the operation time.

When a reduced image is generated by reducing an image input to the digital camera 1 to 1/K, for example, the number of operations for that distortion correction becomes $1/(K^2)$ which is extremely small.

Because the correlation between the image p(x, y) before distortion correction and the projection-transformed image P(u, v) is acquired through correction corresponding to distortion correction at the time of executing the projection transformation process based on affine transformation, the projection-transformed image P(u, v) can be acquired accurately from the image p(x, y) before distortion correction.

Various modes are possible in working out the invention which is not limited to the above-described embodiment.

For example, the image processing apparatus 25 may reduce an image according to the display image, not an image input to the digital camera 1. Even when the input image to the digital camera 1 has an image size of four million pixels, for example, if the display image for a computer has an image size of 1024×768=80,000 pixels, the image processing apparatus 25 can reduce the image of 800,000 pixels to 1/K according to the image size of the display image for the computer. This scheme can further reduce the number of operations for distortion correction to about ⅕ as compared with the case where an image with four million pixels is reduced to 1/K. Even when a sheet of A4 size (297×210 mm) is shot, the sufficient contour extraction precision should normally have as high a resolution as 1 to 2 mm. Therefore, a reduced image even with a size of 320×240 can sufficient achieve the precision. In this case, data can be reduced to ½.

In the embodiment, the digital camera 1 is equipped with the image processing apparatus 25. However, an image shooting apparatus may comprise a computer in addition to the digital camera 1, and the computer may have the image processing apparatus 25 having the aforementioned functions, so that the computer is connected to the digital camera 1. In this modification, a general-purpose digital camera can be used for the digital camera 1.

The image processing apparatus 25 according to the embodiment should not necessarily be used in an image shooting apparatus, but can be constructed in such a way as to a computer is provided with the functions of the image processing apparatus of the embodiment, so that the computer can store images to be subjected to distortion correction and correction of keystone distortion and can execute the image processing on the stored images without using the digital camera 1.

Programs which allow a computer to execute the above-described processes may be stored in a computer-readable recording medium, such as a flexible disk, CD-ROM (Compact Disk Read-Only Memory) or DVD (Digital Versatile Disk), and delivered and installed in the computer so that the computer may operate as the individual means mentioned above or execute the above-described steps. The programs may be stored in a disk unit or the like installed in a server on the Internet, so that the programs may be downloaded to a computer by way of carrier waves on which the programs are multiplexed.

In the embodiment, linear distortion such as keystone distortion and rotational distortion which occurs according to a shooting angle at the time of shooting a subject to be shot is corrected by affine transformation. However, any other projection transformation than affine transformation may be used as long as such projection transformation can correct such linear distortion. Further, projection transformation which cannot precisely correct linear distortion but can correct it approximately may be used. The subject to be shot may not be a sheet on which an original text is written but may be a building, etc. Not only a subject to be shot having a rectangular shape but also a subject to be shot having an arbitrary shape can be treated by the present invention, as long as the shape is known beforehand. Also in this case, a projection parameter can be acquired by comparing the shape of the subject to be shot with a shape acquired from a shot image of the subject to be shot. A projection parameter may be acquired not by acquiring a shot image showing the entire shape of the subject to be shot but by acquiring some distorted points of the subject to be shot.

In the embodiment, distortion correction according to a characteristic of a lens is performed at the time of acquiring a reduced image by reducing a shot image. At the same time of reduction, distortion correction for a distortion whose occurrence is anticipated before shooting due to a factor other than a lens characteristic may be performed at the same time of reduction.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2004-81553 filed on Mar. 19, 2004 and including specification, claims, drawings and summary. The disclosure of the above Japanese patent application is incorporated herein by reference in its entirety.

What is claimed is:

1. An image processing apparatus which corrects distortion of an image, and comprises:
    a shot-image acquisition section which acquires a shot image of a subject to be shot, including a shooting target image which is an image portion corresponding to said subject to be shot, wherein a real shape of said subject to be shot is a rectangle;
    a reduced-image acquisition section which acquires a reduced image that is said shot image with a reduced resolution;
    a distortion information acquisition section which acquires a corrected reduced image by performing distortion correction on said reduced image according to a characteristic of a lens used in shooting, acquires a contour of said shooting target image based on said corrected reduced image, specifies four line portions of said contour, and acquires a shape of a trapezoid formed by said four line portions as distortion information;
    a projection parameter acquisition section which acquires a projection parameter for converting said shooting target image to an ideal distortion-free image based on said distortion information; and a projection transformation section which produces a projection-transformed image by performing projection transformation on said shot image using said projection parameter.

2. The image processing apparatus according to claim 1, wherein said line portions are specified based on Hough transformation, and lines corresponding to a top side, a bottom side, a left side and a right side of said trapezoid are specified according to which directions to a center of said corrected reduced image angles of said line portions acquired by said Hough transformation correspond.

3. The image processing apparatus according to claim 1, wherein said projection transformation section performs said projection transformation at a same time as extracting said shooting target image from said shot image.

4. The image processing apparatus according to claim 1, wherein said projection transformation section performs said projection transformation in association with each pixel position constituting said projection-transformed image, specifies a position on said shot image which corresponds to said each pixel position on said projection-transformed image based on said projection parameter, and uses a pixel value on said shot image which corresponds to said specified position as a pixel value corresponding to said each pixel position on said projection-transformed image.

5. The image processing apparatus according to claim 4, wherein said projection transformation section computes said pixel value corresponding to each pixel position on said projection-transformed image by performing pixel interpolation based on a plurality of pixels near a position on said shot image specified based on said projection parameter.

6. The image processing apparatus according to claim 4, wherein a resolution of said projection-transformed image is lower than a resolution of said shot image.

7. The image processing apparatus according to claim 1, wherein said subject to be shot is a sheet, and
said shooting target image is an image of an original on which what is written on said sheet is transferred.

8. The image processing apparatus according to claim 1, wherein said image processing apparatus is an image shooting apparatus comprising the lens, and an image pickup section which shoots a subject to be shot through said lens, thereby acquiring a shot image, and
wherein a shot image taken by said image pickup section is said shot image to be acquired by said shot-image acquisition section, and said projection-transformed image acquired by said projection transformation section is recorded.

9. An image processing apparatus which corrects distortion of an image, comprising:
a shot-image acquisition section which acquires a shot image of a subject to be shot, including a shooting target image which is an image portion corresponding to said subject to be shot;
a reduced-image acquisition section which acquires a reduced image that is said shot image with a reduced resolution;
a distortion information acquisition section which acquires a corrected reduced image by performing distortion correction on said reduced image according to a characteristic of a lens used in shooting, and acquires distortion information indicative of linear distortion of said shooting target image based on said corrected reduced image;
a projection parameter acquisition section which acquires a projection parameter for converting said shooting target image to an ideal distortion-free image based on said distortion information; and a projection transformation section which produces a projection-transformed image by performing distortion correction according to said characteristic of said lens concurrently with performing projection transformation on said shot image using said projection parameter.

10. An image shooting apparatus which corrects distortion of a shot image, comprising:
a lens having a predetermined characteristic;
an image pickup section which shoots a subject to be shot through said lens, thereby acquiring a shot image, wherein a real shape of said subject to be shot is a rectangle;
a corrected reduced-image acquisition section which acquires a corrected reduced image by reducing a resolution of said shot image and performing distortion correction according to said characteristic of said lens;
a distortion information acquisition section which acquires a contour of said shot subject based on said corrected reduced image, specifies four line portions of said contour, and acquires a shape of a trapezoid formed by said four line portions as distortion information; and
a projection transformation section which converts said shot image to an ideal distortion-free image based on said distortion information.

11. The image shooting apparatus according to claim 10, further comprising a display section which displays said shot image, and wherein said reduced-image acquisition section reduces said shot image in association with a display size of an image to be displayed by said display section.

12. The image shooting apparatus according to claim 10, further comprising a recording section which records a projection-transformed image produced by said projection transformation section.

13. An image processing method comprising:
acquiring a shot image of a subject to be shot, including a shooting target image which is an image portion corresponding to said subject to be shot, wherein a real shape of said subject to be shot is a rectangle;
acquiring a reduced image that is said shot image with a reduced resolution;
acquiring a corrected reduced image by performing distortion correction on said reduced image according to a characteristic of a lens used in shooting;
acquiring a contour of said shooting target image based on said corrected reduced image, specifying four line portions of said contour, and acquiring a shape of a trapezoid formed by said four line portions as distortion information;
acquiring a projection parameter for converting said shooting target image to an ideal distortion-free image based on said distortion information; and
producing a projection-transformed image by performing projection transformation on said shot image using said projection parameter.

14. A recording medium having a program stored thereon which is executable by an image processing apparatus to execute functions comprising:
acquiring a shot image of a subject to be shot, including a shooting target image which is an image portion corresponding to said subject to be shot, wherein a real shape of said subject to be shot is a rectangle;
acquiring a reduced image that is said shot image with a reduced resolution;
acquiring a corrected reduced image by performing distortion correction on said reduced image according to a characteristic of a lens used in shooting;

acquiring a contour of said shooting target image based on said corrected reduced image, specifying four line portions of said contour, and acquiring a shape of a trapezoid formed by said four line portions as distortion information;

acquiring a projection parameter for converting said shooting target image to an ideal distortion-free image based on said distortion information; and producing a projection transformed image by performing projection transformation on said shot image using said projection parameter.

15. A recording medium having a program stored thereon which is executable by an image processing apparatus to execute functions comprising:

acquiring a shot image of a subject to be shot, including a shooting target image which is an image portion corresponding to said subject to be shot;

acquiring a reduced image that is said shot image with a reduced resolution;

acquiring a corrected reduced image by performing distortion correction on said reduced image according to a characteristic of a lens used in shooting;

acquiring distortion information indicative of linear distortion of said shooting target image based on said reduced image;

acquiring a projection parameter for converting said shooting target image to an ideal distortion-free image based on said distortion information; and producing a projection-transformed image by performing distortion correction according to said characteristic of said lens concurrently with performing projection transformation on said shot image using said projection parameter.

* * * * *